United States Patent

Shave

[11] Patent Number: 6,007,139
[45] Date of Patent: Dec. 28, 1999

[54] TAILGATE ASSEMBLY

[75] Inventor: Bryan Leslie Shave, Kingston Bag Puize, United Kingdom

[73] Assignee: Rover Group Limited, Warwick, United Kingdom

[21] Appl. No.: 09/352,395

[22] Filed: Jul. 13, 1999

[30] Foreign Application Priority Data

Aug. 13, 1998 [GB] United Kingdom .................... 9817516

[51] Int. Cl.⁶ ....................................................... B60J 5/00
[52] U.S. Cl. ........................................... 296/146.8; 296/56
[58] Field of Search .............................. 296/51, 56, 146.8

[56] References Cited

U.S. PATENT DOCUMENTS

| | | | |
|---|---|---|---|
| 3,713,472 | 1/1973 | Dozois | 296/56 |
| 3,716,945 | 2/1973 | Cooper et al. | 296/56 |
| 3,749,440 | 7/1973 | Lathers | 296/51 |
| 4,620,743 | 11/1986 | Eke . | |
| 4,688,844 | 8/1987 | Hirose et al. | 296/51 |

FOREIGN PATENT DOCUMENTS

| | | |
|---|---|---|
| 2262301 | 6/1993 | United Kingdom . |
| 2267109 | 11/1993 | United Kingdom . |

*Primary Examiner*—Gary C. Hoge
*Attorney, Agent, or Firm*—Davis and Bujold

[57] ABSTRACT

A generally vertical tailgate assembly 16 is disclosed having a first upper tailgate portion 18 and a second lower tailgate portion 24. The first upper tailgate portion 18 is disposed for rotation about a generally horizontal axis extending along an upper edge thereof. The lower tailgate portion 24 is adapted to move from a first closed position in which an upper edge thereof is adjacent a lower edge of the upper tailgate portion 18 to a second open position in which the upper edge thereof is adjacent the upper edge of the upper tailgate portion. Both portions 18,24 of the tailgate assembly 16 may then be moved together about the upper edge of the upper tailgate portion. This construction has the advantage that opening of the tailgate assembly requires a reduced clearance behind the motor vehicle.

6 Claims, 7 Drawing Sheets

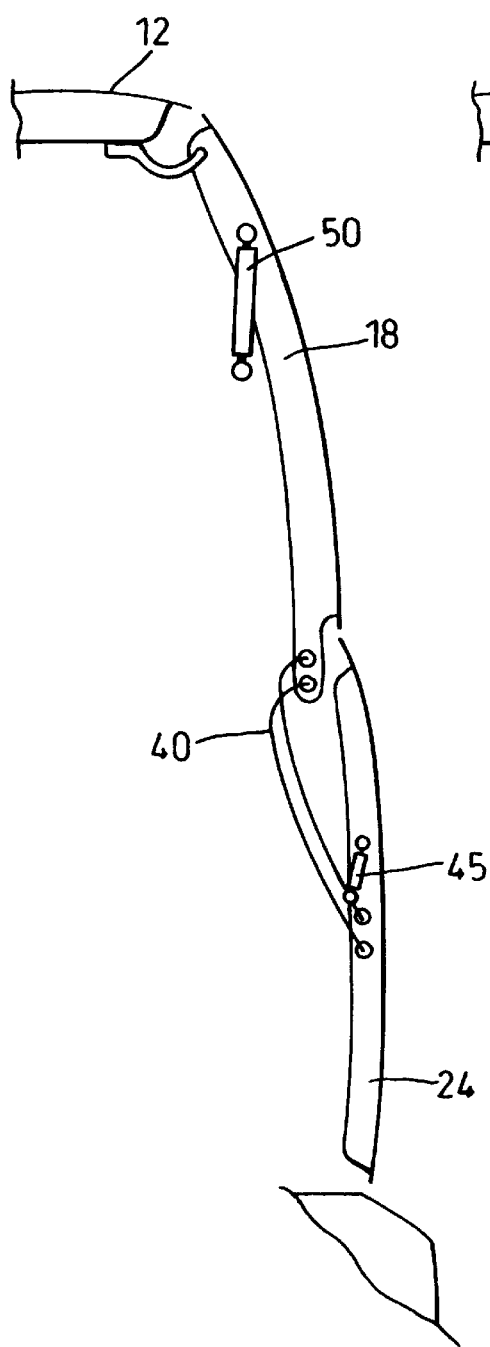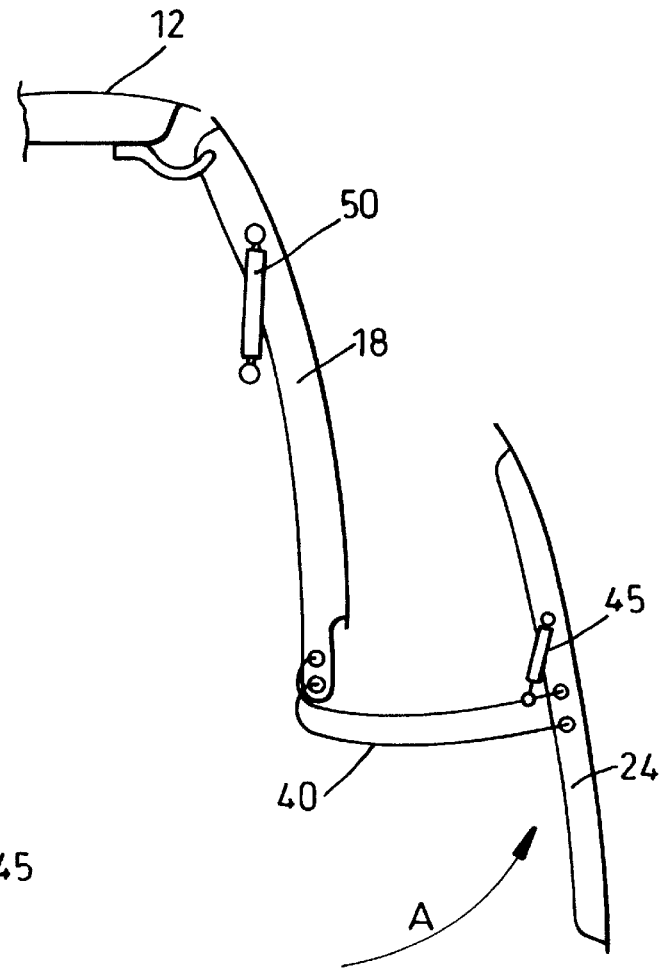
*Fig. 4*  *Fig. 5*

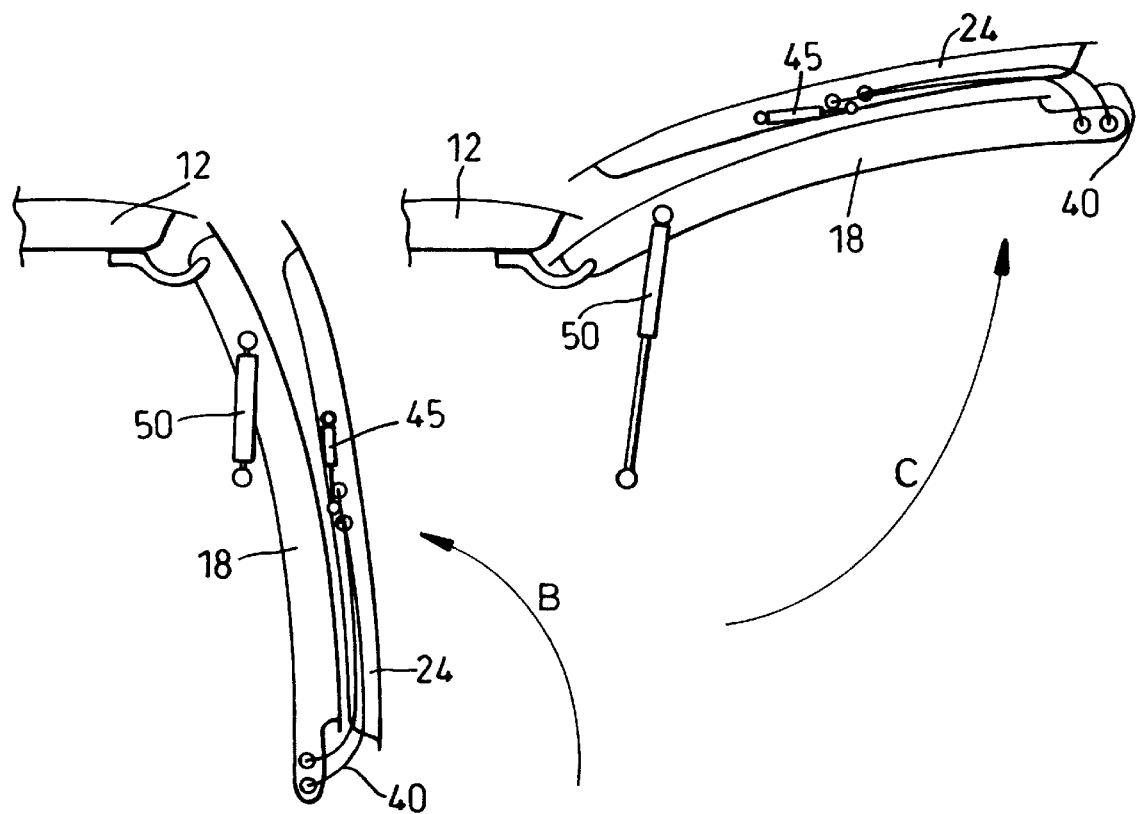
Fig. 6  Fig. 7

TAILGATE ASSEMBLY

The present invention relates to a tailgate assembly, and in particular, but not exclusively, to a tailgate assembly for use on a motor vehicle.

Tailgate assemblies adapted to rotate or to pivot about a generally horizontal axis are well known. A tailgate assembly allows a user to have access to a boot or other storage space of a motor vehicle located behind or beneath the tailgate assembly. However, in the case of a tailgate assembly that is substantially vertical in the closed position, a number of problems can arise.

Firstly, the weight of the tailgate assembly may make opening of the tailgate assembly difficult, particularly if the motor vehicle is parked on an incline or the weather conditions are unfavourable.

Secondly, tailgate assemblies of this kind require a significant amount of clearance behind the motor vehicle in order to open the tailgate assembly. Such clearance is not always easily available in the modern congested urban environment. In particular, the clearance that may have been available when the motor vehicle was parked may no longer be available when the user returns bearing a load for stowage in the storage space behind the tailgate assembly.

It is an advantage of the present invention that it eliminates or substantially reduces the problems noted above.

According to the present invention, a generally vertical tailgate assembly comprises a first upper tailgate portion and a second lower tailgate portion, the first upper tailgate portion being disposed for rotation about a generally horizontal axis extending along an upper edge thereof, characterised in that the lower tailgate portion is adapted to move from a first closed position in which an upper edge thereof is adjacent a lower edge of the upper tailgate portion to a second open position in which the upper edge thereof is adjacent the upper edge of the upper tailgate portion.

The tailgate assembly according to the present invention has the advantage that to open the tailgate assembly a reduced clearance behind the motor vehicle is required than was the case for the known tailgate assembly noted above. In addition, while the whole tailgate assembly is of a similar weight to this known tailgate assembly, because the radius of rotation is shorter, easier purchase may be had on the tailgate assembly making it easier to open.

Preferably, the lower tailgate portion is moved from the first closed position to the second open position by way of a pantographic hinge between the upper tailgate portion and the lower tailgate portion.

Preferably, the pantographic hinge is assisted by a first set of gas struts disposed between the upper tailgate portion and the lower tailgate portion.

Preferably, a second set of gas struts are disposed between the upper tailgate portion and a body of a motor vehicle to which the tailgate assembly is fitted.

The invention will now be described, by way of example only, with reference to the accompanying drawings, in which:

FIG. 4 shows a side sectional view of a motor vehicle including a tailgate assembly according to the present invention in a closed position;

FIG. 5 shows a side sectional view of the motor vehicle shown in FIG. 4 in which a lower portion of the tailgate assembly is in a part open position;

FIG. 6 shows a side sectional view of the motor vehicle shown in FIG. 4 in which a lower portion of the tailgate assembly is in a fully open position;

FIG. 7 shows a side sectional view of the motor vehicle shown in FIG. 4 in which he tailgate assembly is in a fully open position;

Figure 1:
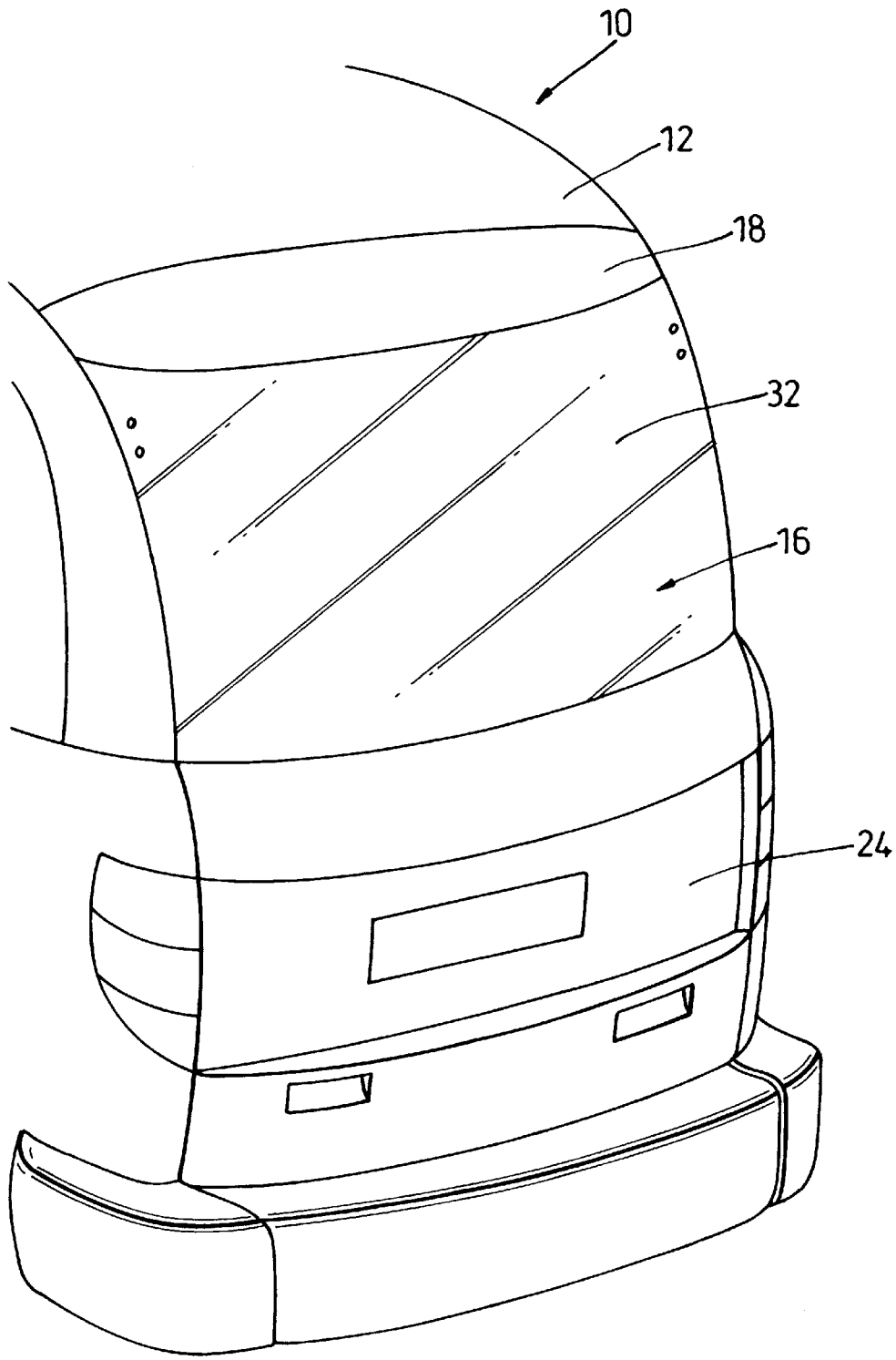
FIG. 1 shows a perspective rear view of a motor vehicle including a tailgate assembly according to the present invention in a closed position.
Figure 2:
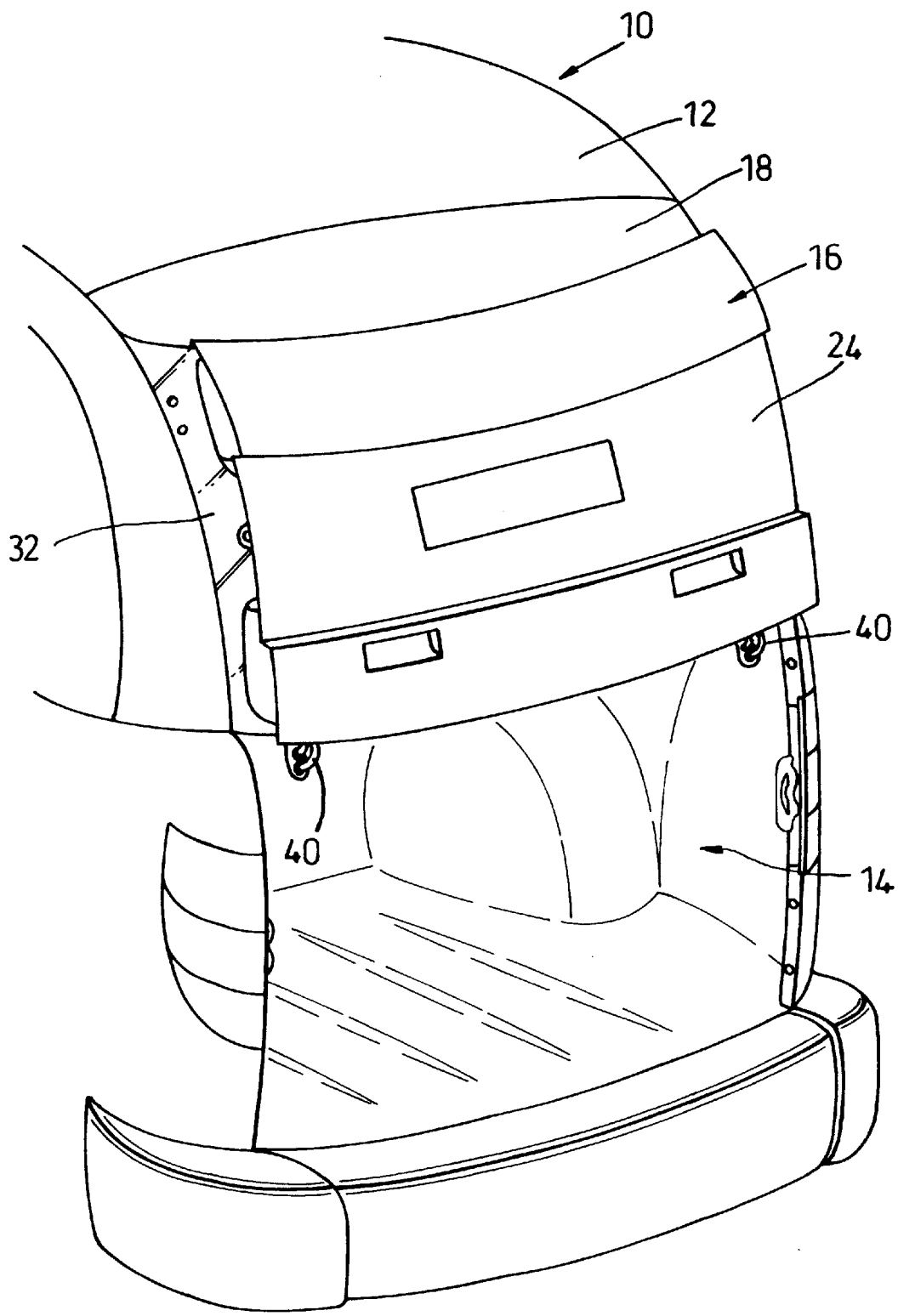
FIG. 2 shows a perspective rear view of the motor vehicle shown in FIG. 1 in which the tailgate assembly is in a part open position.
Figure 3:
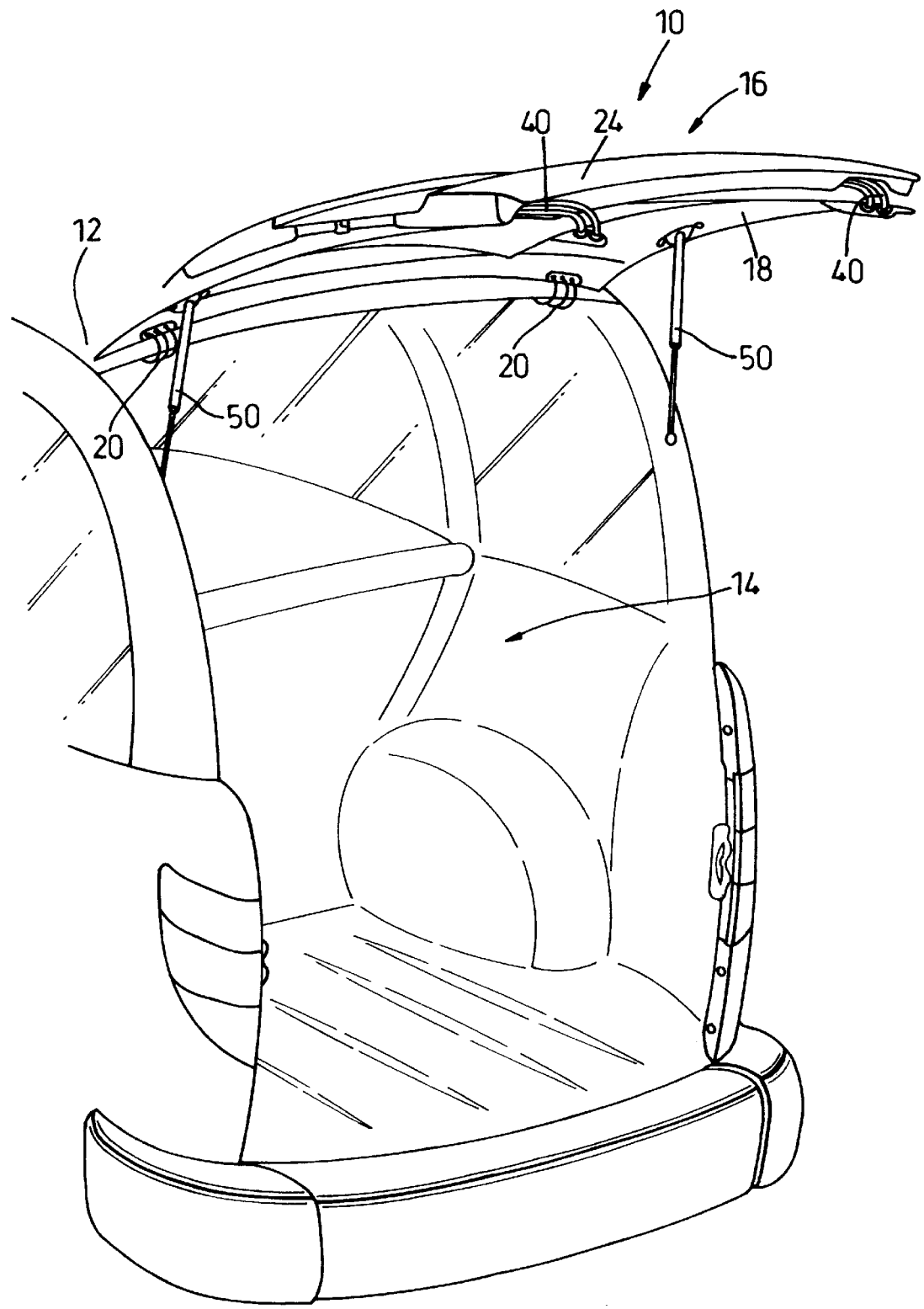
FIG. 3 shows perspective rear view of the motor vehicle shown in FIG. 1 in which the tailgate assembly is in a fully open position.

Referring to the Figures, and in particular to FIGS. 1 to 3, a motor vehicle 10 has a body 12 with an opening 14 at its rear end. A tailgate assembly 16 includes an upper portion 18 attached at an upper edge by hinges 20 to the vehicle body, and a lower portion 24 attached to the upper portion 18. The upper portion 18 includes a rear windscreen 32 of the motor vehicle. The hinges 20 are mounted on each side of the upper portion of the tailgate assembly 16. A conventional latch is provided on the lower portion 24 to secure the tailgate assembly in a closed position.

The lower portion of the tailgate assembly is secured to the upper portion of the tailgate assembly, and is adapted to move in relation to it. In the illustrated embodiment, the lower portion of the tailgate assembly is connected to the upper portion of the tailgate assembly by way of a pair of pantograph hinges 40. The hinges 40 are mounted on each side of the tailgate assembly 16.

To assist movement of the tailgate assembly a first set of gas struts 45 are mounted on each side of the lower portion of the tailgate assembly 16 between the lower portion of the tailgate assembly and one of the pantographic hinges. Each of the first set of gas struts is in a retracted position when the lower portion of the tailgate assembly is in the closed position.

In addition a second set of gas struts 50 are mounted on each side of the upper portion of the tailgate assembly between the upper portion of the tailgate assembly and the vehicle body. Each of the second set of gas struts is in a retracted position when the upper portion of the tailgate assembly is in the closed position.

In order to move the tailgate portion from the closed position to an open position, the latch should be unlocked to allow movement of the lower portion of the tailgate assembly (FIG. 4).

The lower portion of the tailgate assembly may now be moved outwardly away from the vehicle body, in the direction of the arrow A in FIG. 5. The lower portion of the tailgate assembly is then moved upwards as indicated by arrow B in FIG. 6 to cover the upper portion of the tailgate assembly. In this position, each of the first set of gas struts 45 is in an extended position. The first set of gas struts 45 act to keep the lower portion of the tailgate assembly in this position. The second set of gas struts 50 remain in the retracted position The upper and lower portions of the tailgate assembly can now be moved together by rotation about the generally horizontal axis into a fully opened position as indicated by arrow C in FIG. 7. Each of the first set of gas struts 45 remains in the extended position. The second set of gas struts are extended to be in an extended position and act to keep the tailgate assembly in this position.

The closure of the tailgate assembly 16 is achieved by retracing the steps followed to open it. In other words, the upper portion 18, together with the lower portion 24, is swung back to a substantially vertical position before the lower portion 24 is moved about the upper portion 18 to return the lower portion 24 to the closed position.

Figure 8:
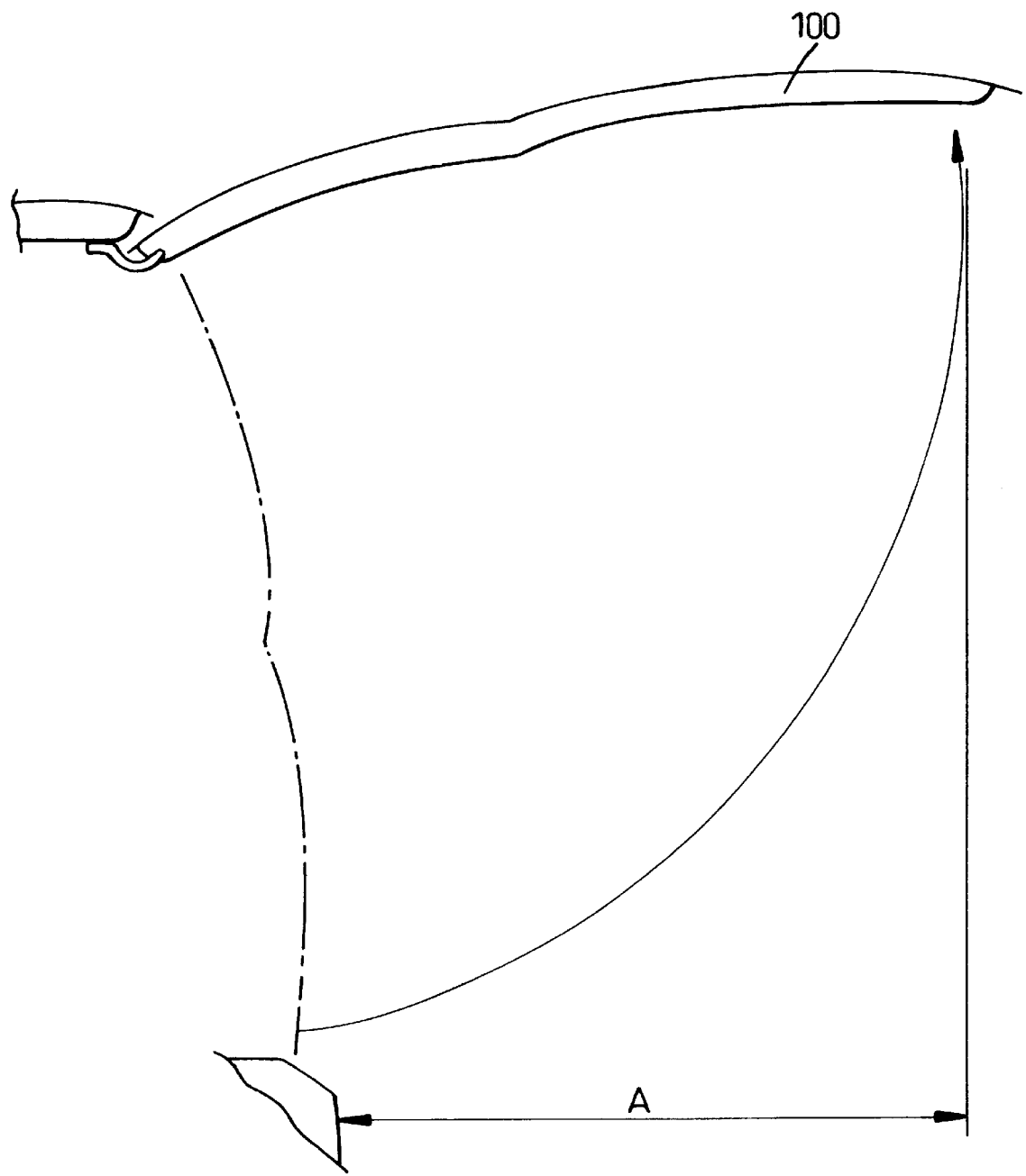
FIG. 8 shows a side sectional view of a motor vehicle including a known tailgate assembly in a fully open position.
Figure 9:
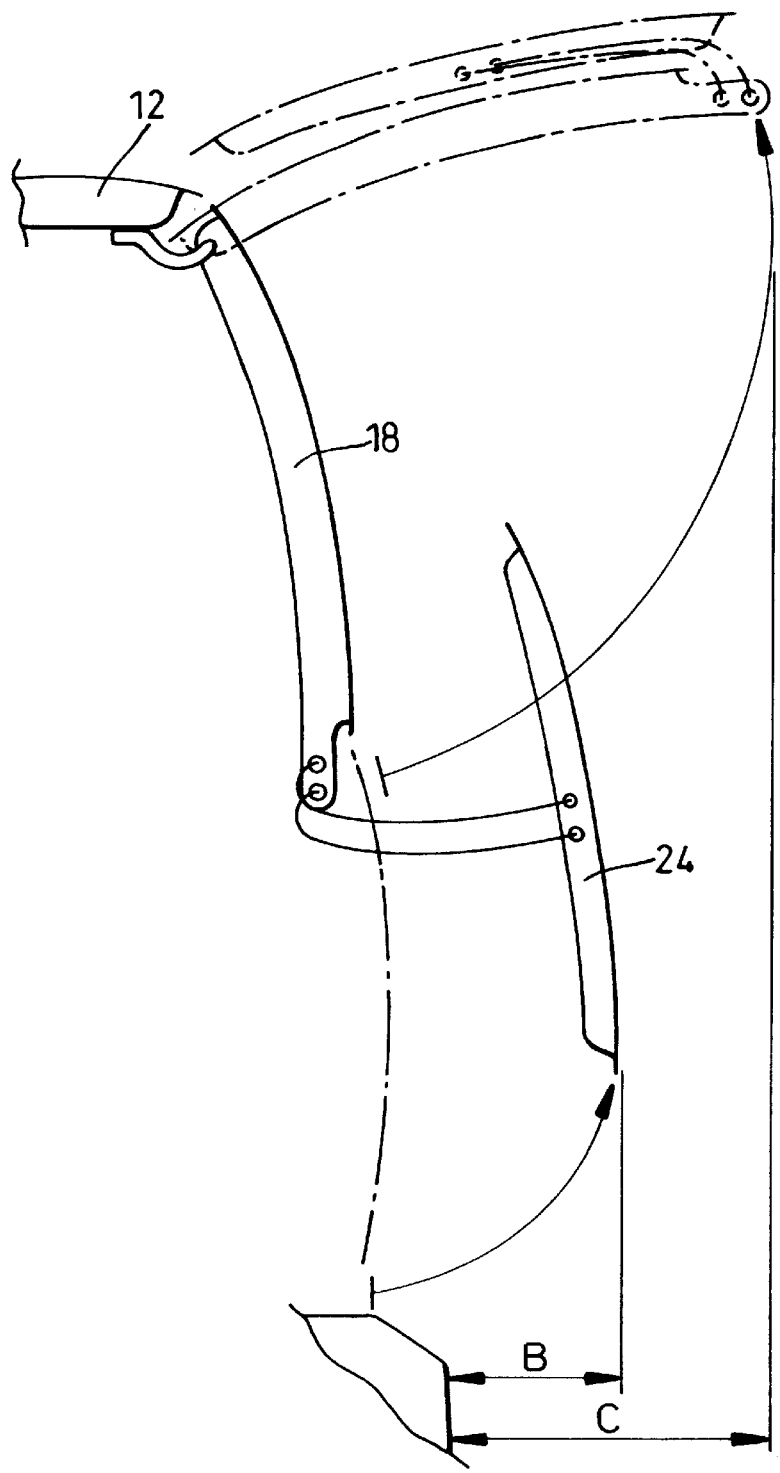
FIG. 9 shows a side sectional view of a motor vehicle including a tailgate assembly according to the present invention in which a lower portion of the tailgate assembly is in a partly open position.

This two stage operation of the tailgate assembly requires less clearance behind the motor vehicle in order to obtain access to the interior of the motor vehicle. In a prior art motor vehicle tailgate assembly comprising a unitary tailgate 100 rotatable about an upper edge (FIG. 8), it can be seen that a clearance distance A approximately equal to the height of the tailgate assembly is required in order to open the tailgate. In FIG. 9, showing a tailgate assembly according to the present invention, it can be seen that a first clearance distance B is required to open the lower tailgate portion 24, and a second clearance distance C is required to open the upper and lower tailgate portions together. It is clear that a smaller clearance is required to open the tailgate assembly of the present invention than is required to open the known tailgate assembly of FIG. 8.

It will be understood that if a user requires access only to a lower portion of the interior space of the vehicle, then it is possible to open only the lower portion 24 of the tailgate assembly.

I claim:

1. A tailgate assembly comprises a first upper tailgate portion and a second lower tailgate portion, the first upper tailgate portion being disposed for rotation about a generally horizontal axis extending along an upper edge thereof, characterised in that the lower tailgate portion is adapted to move from a first closed position in which an upper edge thereof is adjacent a lower edge of the upper tailgate portion to a second open position in which the upper edge thereof is adjacent the upper edge of the upper tailgate portion.

2. A tailgate assembly according to claim 1, wherein the lower tailgate portion is moved from the first closed position to the second open position by way of a pantographic hinge between the upper tailgate portion and the lower tailgate portion.

3. A tailgate assembly according to claim 1, wherein the lower tailgate portion is moved from the first closed position to the second open position by way of a pantographic hinge between the upper tailgate portion and the lower tailgate portion and the pantographic hinge is assisted by a first set of gas struts disposed between the upper tailgate portion and the lower tailgate portion.

4. A tailgate assembly according to claim 1, wherein a second set of gas struts are disposed between the upper tailgate portion and a body of a motor vehicle to which the tailgate assembly is fitted.

5. A tailgate assembly according to claim 1, wherein the lower tailgate portion is moved from the first closed position to the second open position by way of a pantographic hinge between the upper tailgate portion and the lower tailgate portion and a second set of gas struts are disposed between the upper tailgate portion and a body of a motor vehicle to which the tailgate assembly is fitted.

6. A tailgate assembly according to claim 1, wherein the lower tailgate portion is moved from the first closed position to the second open position by way of a pantographic hinge between the upper tailgate portion and the lower tailgate portion and the pantographic hinge is assisted by a first set of gas struts disposed between the upper tailgate portion and the lower tailgate portion and a second set of gas struts disposed between the upper tailgate portion and a body of a motor vehicle to which the tailgate assembly is fitted.

* * * * *